United States Patent
Kajiwara

[11] Patent Number: 5,432,509
[45] Date of Patent: Jul. 11, 1995

[54] WARNING APPARATUS FOR A VEHICLE

[75] Inventor: Yasuya Kajiwara, Himeji, Japan

[73] Assignee: Mitsubishi Denki Kabushiki Kaisha, Tokyo, Japan

[21] Appl. No.: 980,779

[22] Filed: Nov. 24, 1992

[30] Foreign Application Priority Data

Dec. 3, 1991 [JP] Japan .................. 3-319034

[51] Int. Cl.$^6$ ............................. G08G 1/16
[52] U.S. Cl. .................... 340/903; 180/271; 180/272; 180/282; 367/909; 340/555; 340/556
[58] Field of Search ............ 180/271, 272, 282; 367/909; 340/903, 555, 556

[56] References Cited

U.S. PATENT DOCUMENTS

| | | | |
|---|---|---|---|
| 3,227,998 | 1/1966 | Platt | 180/272 |
| 3,680,085 | 7/1972 | Del Signore | 367/909 |
| 4,491,840 | 1/1985 | Nishikawa et al. | 367/909 |
| 4,926,170 | 5/1990 | Beggs et al. | 340/904 |
| 5,091,726 | 2/1992 | Shyu | 340/903 |

FOREIGN PATENT DOCUMENTS

| | | |
|---|---|---|
| 15337 | 4/1980 | Japan . |
| 22291 | 6/1980 | Japan . |
| 45412 | 11/1980 | Japan . |

Primary Examiner—John K. Peng
Assistant Examiner—Daryl C. Pope
Attorney, Agent, or Firm—Sughrue, Mion, Zinn, Macpeak & Seas

[57] ABSTRACT

A warning apparatus for a vehicle generates a warning for a driver of the vehicle when the separation between the vehicle and an obstacle located in front of the vehicle falls below a prescribed value. The prescribed value is varied in accordance with changes in the physical or mental state of the driver of the vehicle, environmental conditions, or the driving characteristics of the driver and thereby adjust to changes in the driver's reaction time and the stopping distance of the vehicle.

8 Claims, 7 Drawing Sheets

WARNING APPARATUS FOR A VEHICLE

BACKGROUND OF THE INVENTION

This invention relates to a warning apparatus for a vehicle such as an automobile which can warn the operator of the vehicle when there is the possibility of a collision with an obstacle located in front of the vehicle. More particularly, it relates to a warning apparatus which varies the conditions which must be satisfied for a warning to be generated in accordance with the physical or mental state of the driver, the driving characteristics or the driver, environmental conditions, or other factors.

Various collision warning devices for passenger vehicles have been proposed in the past. In these devices, some form of radiation, such as a laser beam or radar, is used to determine the separation between a vehicle in which the warning device is installed and an obstacle located in front of the vehicle, such as another vehicle or a pedestrian. Based on the speed of the vehicle and the rate of change of the distance between the vehicle and the obstacle, the warning device determines when there is danger of a collision between the vehicle and the obstacle and generates a warning to alert the driver to take evasive action.

In a conventional warning device, a warning is generated whenever prescribed conditions are satisfied. However, the reaction time of the driver of a vehicle and the ability of the vehicle to stop in order to avoid an accident vary greatly in accordance with the circumstances. For example, when the driver is tired, he takes longer to react to a warning than when he is alert. Similarly, it takes much longer for a vehicle to stop on a wet road surface than on a dry one. If the conditions to be satisfied in order for the warning to be generated are chosen conservatively so as to allow the driver ample time to stop the vehicle even when the driver is tired or when the road conditions are bad, the warning will be generated even in situations when unnecessary and will become an annoyance to the driver. On the other hand, if the conditions to be satisfied are chosen with a smaller margin of safety so that the warning will be generated in fewer situations, there may be situations in which the warning does not leave the driver sufficient time to safely stop the vehicle and avoid an accident.

SUMMARY OF THE INVENTION

Accordingly, it is an object of the present invention to provide a warning apparatus for a vehicle which can adapt to changes in the physical or mental state of the driver of the vehicle.

It is yet another object of the present invention to provide a warning apparatus which can adapt to changes in the environment in which the vehicle is travelling.

A warning apparatus for a vehicle according to the present invention generates a warning for a driver of the vehicle when the separation between the vehicle and an obstacle in front of the vehicle falls below a predetermined value. The predetermined value is varied in accordance with changes in a condition which affects the ability of the vehicle to stop.

In one form of the present invention, the predetermined value for the vehicle separation is varied in accordance with changes in the physical or mental state of the driver. For example, the predetermined value can be increased when it is determined that the driver is tired or napping or looking away from the road.

In another form of the present invention, the predetermined value for the vehicle separation is varied in accordance with changes in an environmental condition of the environment in which the vehicle is traveling. For example, the predetermined value can be increased when the environmental conditions are such as to increase the stopping distance of the vehicle or the reaction time of the driver.

In yet another form of the present invention, the predetermined value for the vehicle separation is varied in accordance with changes in the driving characteristics of the driver. For example, when the driving characteristics indicate that the driver is tired, the predetermined value for the vehicle separation can be increased.

DESCRIPTION OF PREFERRED EMBODIMENTS

A number of preferred embodiments of a warning apparatus for a vehicle according to the present invention will be described while referring to the accompanying drawings. In these embodiments, the present invention is applied to a vehicle in the form of an automobile, but it could be applied to a different type of vehicle, such as a motorcycle.

Figure 1:
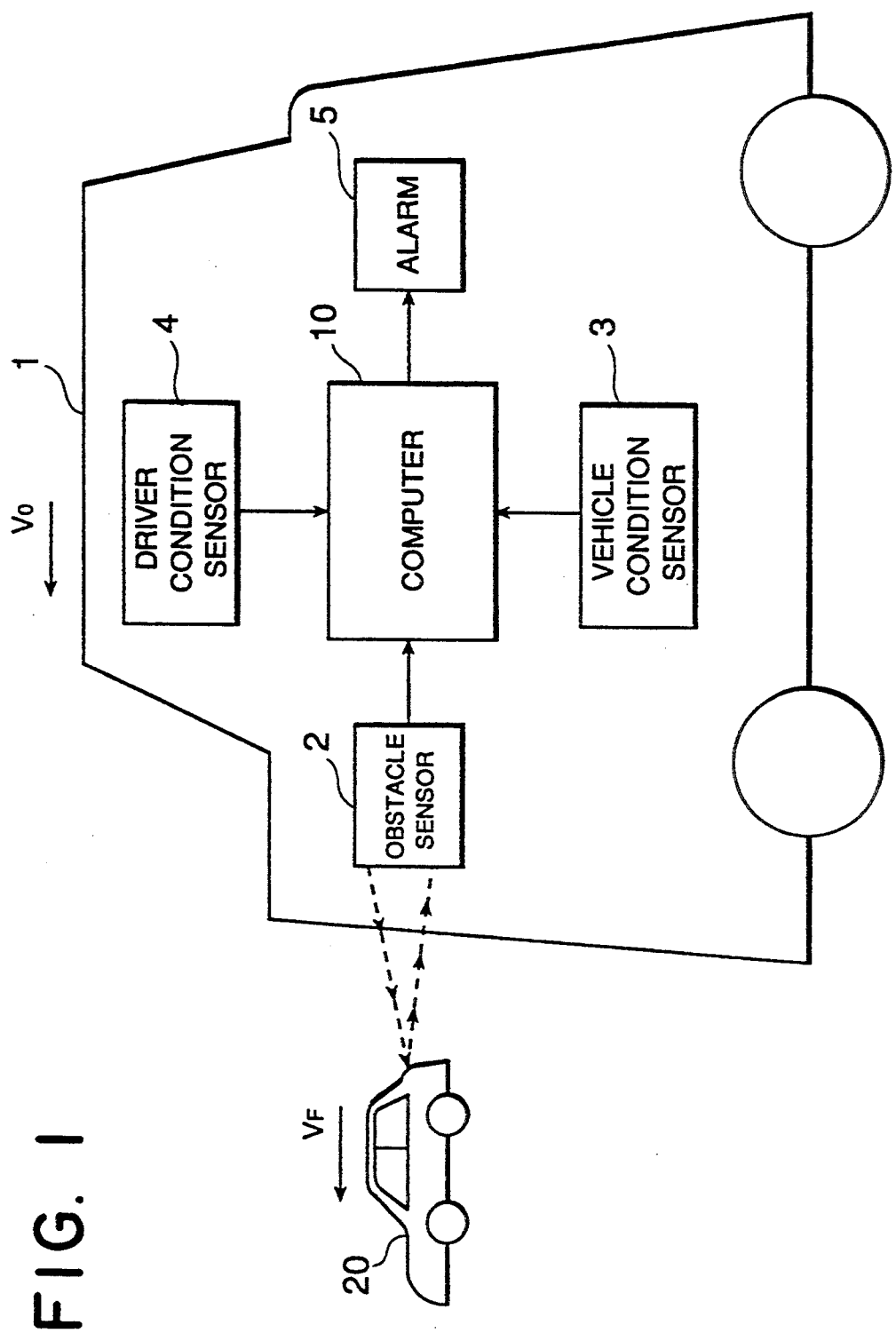
FIG. 1 is a block diagram of an embodiment of a warning apparatus according to the present invention.

FIG. 1 schematically illustrates a first embodiment of a warning apparatus installed on a first vehicle 1 in the form of an automobile travelling in the direction of the arrow at a velocity $V_0$. On the road ahead of the first vehicle 1 is an obstacle in the form of a second vehicle 20 travelling at a speed $V_F$ in the same direction as the first vehicle 1. However, the obstacle need not be moving, and it can be an object other than a vehicle, such as a pedestrian or an animal crossing the road. Although the first vehicle 1 is illustrated as being larger than the second vehicle 20, this is merely for ease of illustration, and the relative sizes of the first and second vehicles is not important.

The warning apparatus includes an obstacle sensor 2, which can be any device capable of sensing the separation between the first vehicle 1 and the second vehicle 20. For example, it can be a device which generates a beam of radiation, such as a beam of light waves, radar, radio waves, or ultrasonic waves, reflected off the second vehicle 20 and returned to the obstacle sensor 2. Alternatively, it can be an imaging device which forms an image of the second vehicle 20 and measures the separation based on the image. The obstacle sensor 2 generates an output signal indicating the measured separation from the second vehicle 20 and provides the output signal to a controller in the form of a computer 10.

Examples of methods that can be used by the obstacle sensor 2 to measure the separation from the second vehicle 20 include triangulation and stereo processing of a plurality of video images. Based on the time rate of change of the separation, the relative speed of the first and second vehicles as well as the speed of the second vehicle 20 can be determined.

The obstacle sensor 2 could also be a device which receives information transmitted from a sensor mounted on or along the road and which calculates the separation between the vehicles and their relative speed based on the transmitted information.

A vehicle condition sensor 3 senses one or more operating conditions of the first vehicle 1, such as the vehicle speed, the engine rotational speed, the engine torque, the vehicle acceleration, the steering angle of the steering wheel, or the yaw rate of the speed change ratio. Sensors for sensing such parameters are well known to those skilled in the art, and one or more such conventional sensors can be employed as the vehicle condition sensor 3. An output signal indicating the condition or conditions detected by the vehicle condition sensor 3 is input to the computer 10 by the vehicle condition sensor 3.

A driver condition sensor 4 senses one or more conditions indicative of the physical or mental state of the driver of the first vehicle 1 and generates a corresponding output signal which is input to the computer 10. The driver condition sensor 4 can be a device which senses when the driver is tired, napping, or looking away from the road, or it can sense any other condition in which the driver's reaction time is expected to be impaired. These conditions can be sensed either directly or indirectly. For example, when the driver is manipulating one of the accessories of the vehicle such as the air conditioner, the radio, the cigarette lighter, or a car telephone, it can be inferred that the driver is looking away from the road and therefore requires a longer time to react to a warning.

Based on the input signals from sensors 2-4, the computer 10 determines when a dangerous condition exists, i.e., a condition when the separation between the first and second vehicles is too small given the present speeds of the two vehicles, and in response it controls an alarm 5 to generate a warning. Any type of warning device can be used as the alarm 5, such as a buzzer, a chime, a computer-generated voice, or a flashing light. The alarm 5 warns the driver of the first vehicle 1 to slow down or take evasive action so as not to collide with the second vehicle 20.

Figure 2:
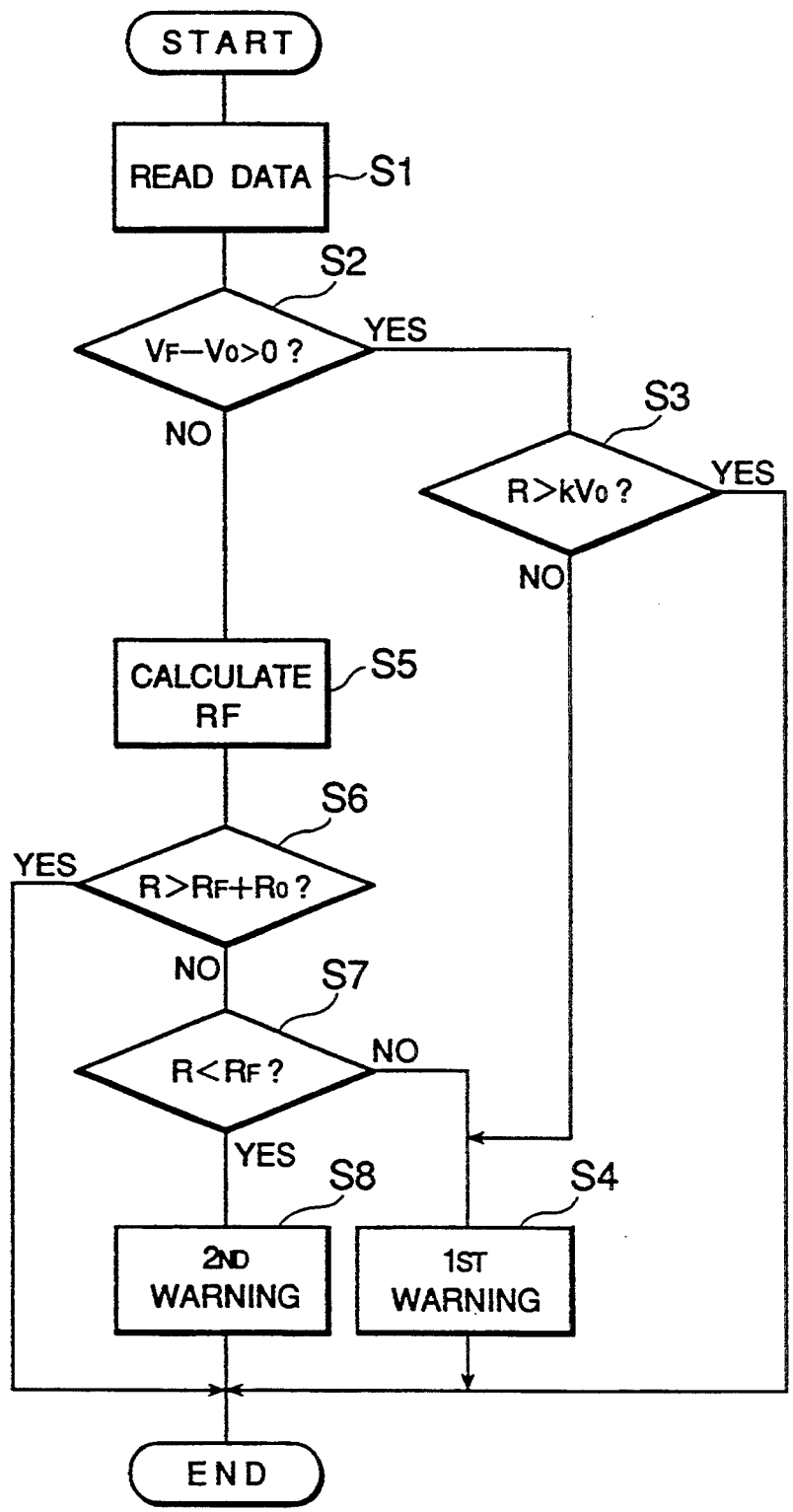
FIG. 2 is flow chart illustrating the operation of the embodiment of FIG. 1.

FIG. 2 illustrates an example of a routine performed by the computer 10 to control the operation of the embodiment illustrated in FIG. 1. In Step S1, the computer 10 reads in data from each of sensors 2-4. In Step S2, the computer 10 determines whether the relative speed $V_F$-$V_0$ of the first and second vehicles is greater than 0, wherein $V_F$ is the speed of the second vehicle 20 and $V_0$ is the speed of the first vehicle 1. The relative speed can be calculated by the computer 10 based on the time rate of change of the vehicle separation R determined by the obstacle sensor 2. If the relative speed is positive, i.e., if the separation between the two vehicles is increasing, then in Step S3, it is determined whether the vehicle separation R is greater than $kV_0$, wherein k is a coefficient determined by the computer 10. k can be a constant, or it can varied by the computer 10 as described below. If the separation R is less than or equal to $kV_0$, then in Step S4, the computer 10 controls the alarm 5 to generate a first warning to caution the driver.

In Step S2, if the relative speed is negative, it means that the first vehicle 1 is growing closer to the second vehicle 20, so in Step S5, the computer 10 calculates the minimum required vehicle separation $R_F$ required for the first vehicle 1 to decelerate from its present speed of $V_0$ to the same speed $V_F$ as the second vehicle 20 without colliding with the second vehicle 20 upon the driver of the first vehicle 1 being given a warning by the alarm 5 to slow down. $R_F$ can be calculated from the formula $$R_F = \frac{(V_0 - V_F)^2}{2|\alpha|} + (V_0 - V_F) t_0 \qquad (1)$$

wherein $t_0$ is the reaction time of the driver, i.e., the time between when the warning is generated by the alarm 5 and when the driver actually depresses the brake pedal, and $\alpha$ is the assumed rate of deceleration of the first vehicle 1 when the driver depresses the brake pedal.

In Step S6, the computer 10 determines whether the actual separation R between the first and second vehicles is greater than $R_F+R_0$, wherein $R_0$ is a predetermined safety factor, such as the value $kV_0$ used in Step S3. If the vehicle separation R is less than or equal to this sum, then in Step S7 it is determined whether the vehicle separation R is less than $R_F$. If R is greater than or equal to $R_F$, then the driver can safely slow down the first vehicle 1 with a normal deceleration $\alpha$, so in Step S4, the alarm 5 is driven to generate the first warning. However, in Step S7, if the vehicle separation R is smaller than $R_F$, then a dangerous situation exists, because if the second vehicle 20 continues at its present speed, braking of the first vehicle at the normal deceleration $\alpha$ can not avert a collision. Therefore, in Step S8, the alarm 5 is driven to generate a second warning which alerts the driver to take immediate evasive action, such as stepping more firmly on the brakes or turning the steering wheel to avoid the second vehicle 20.

In Step S3, if the vehicle separation R is larger than $kV_0$, or in Step S6, if the vehicle separation is larger than $R_F+R_0$, there is no immediate danger of a collision, so a warning is not generated and the routine is ended.

When the driver of the vehicle is tired or napping or looking away from the road, his reaction time will generally be slower than when he is alert and concentrating on the road. Thus, for safety reasons, it is desirable to maintain a larger separation between the first and second vehicles when the driver's reaction time is impaired.

Therefore, in the present embodiment, the value of the vehicle separation R at which the first and second warnings are generated is varied by the computer 10 in accordance with the condition of the driver as indicated by the driver condition sensor 4. For example, when it is sensed that the driver is tired or sleepy or looking away from the road, the computer 10 can increase one or more of the variables $R_0$, k, or $t_0$. Increasing any of these variables will increase the value of the separation R at which a warning is generated and thereby ensure that the driver has sufficient time after generation of a warning to brake the first vehicle 1 without colliding with the second vehicle 2.

Figure 3:
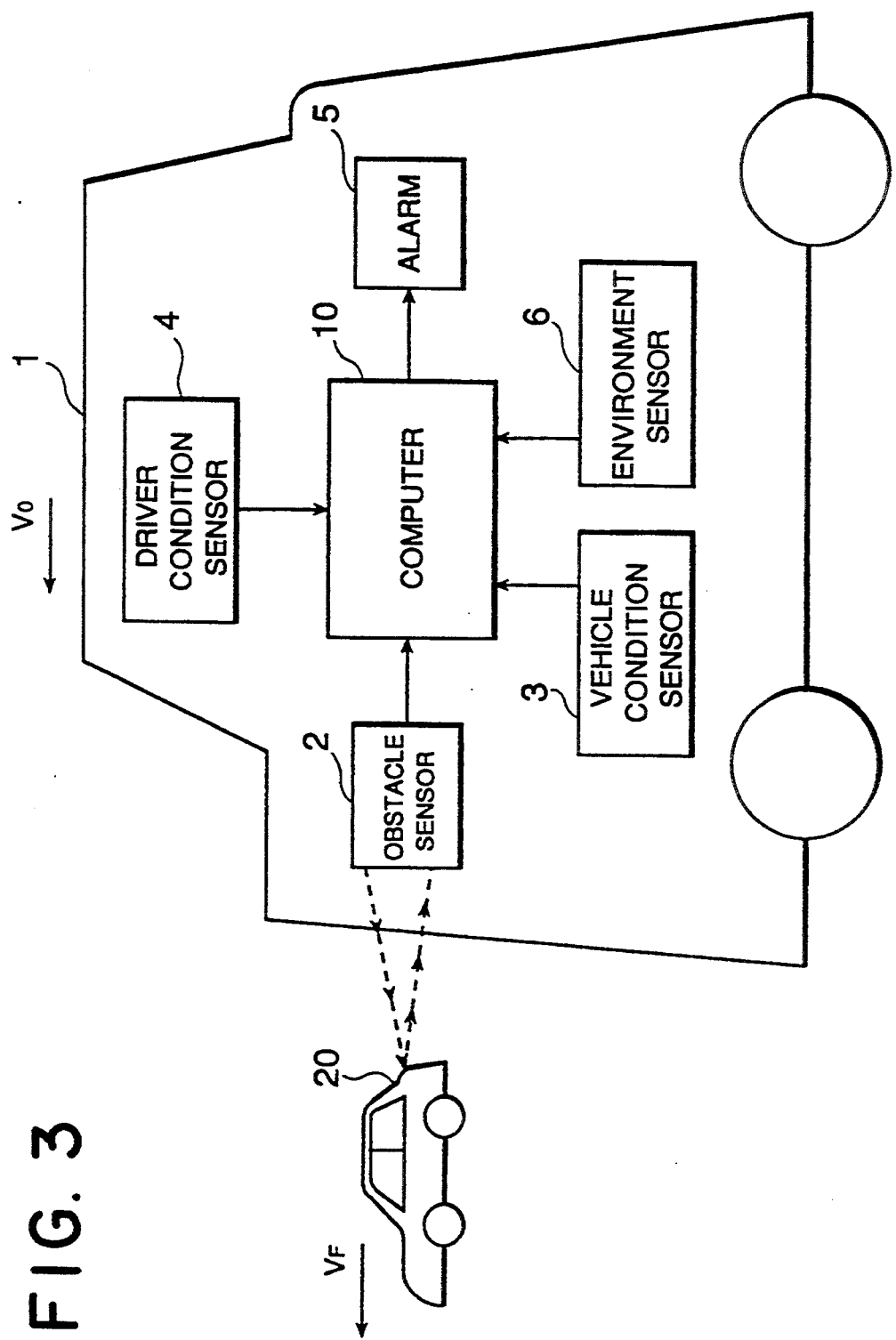
FIG. 3 is a block diagram of another embodiment of a warning apparatus according to the present invention.

FIG. 3 illustrates another embodiment of the present invention installed on a first vehicle 1. The overall structure of this embodiment is similar to that of the previous embodiment, and elements 2–5 can have the same structure as described with respect to FIG. 1. This embodiment further includes an environment sensor 6 which senses one or more conditions of the environment in which the first vehicle 1 is travelling and generates a corresponding output signal, which is provided to the computer 10. Preferably, the environment sensor 6 detects an environmental condition which affects the distance required for the driver to stop the first vehicle 1, such as the presence of rain or wind, or it can detect an environmental condition which affects the driver's reaction speed, such as fog. These conditions can be detected either directly or indirectly. For example, in order to directly sense rain, a rain or fog sensor could be installed on the road, and the environment sensor 6 could be a device which receives signals transmitted by the rain or fog sensor. Alternatively, the occurrence of rain or fog could be indirectly sensed by detecting when the driver of the first vehicle 1 turns on windshield wipers or fog lamps.

The computer 10 receives the signals generated by sensors 2–4 and 6 and determines when a dangerous condition exists, upon which it drives the alarm 5 to generate a warning.

Figure 4:
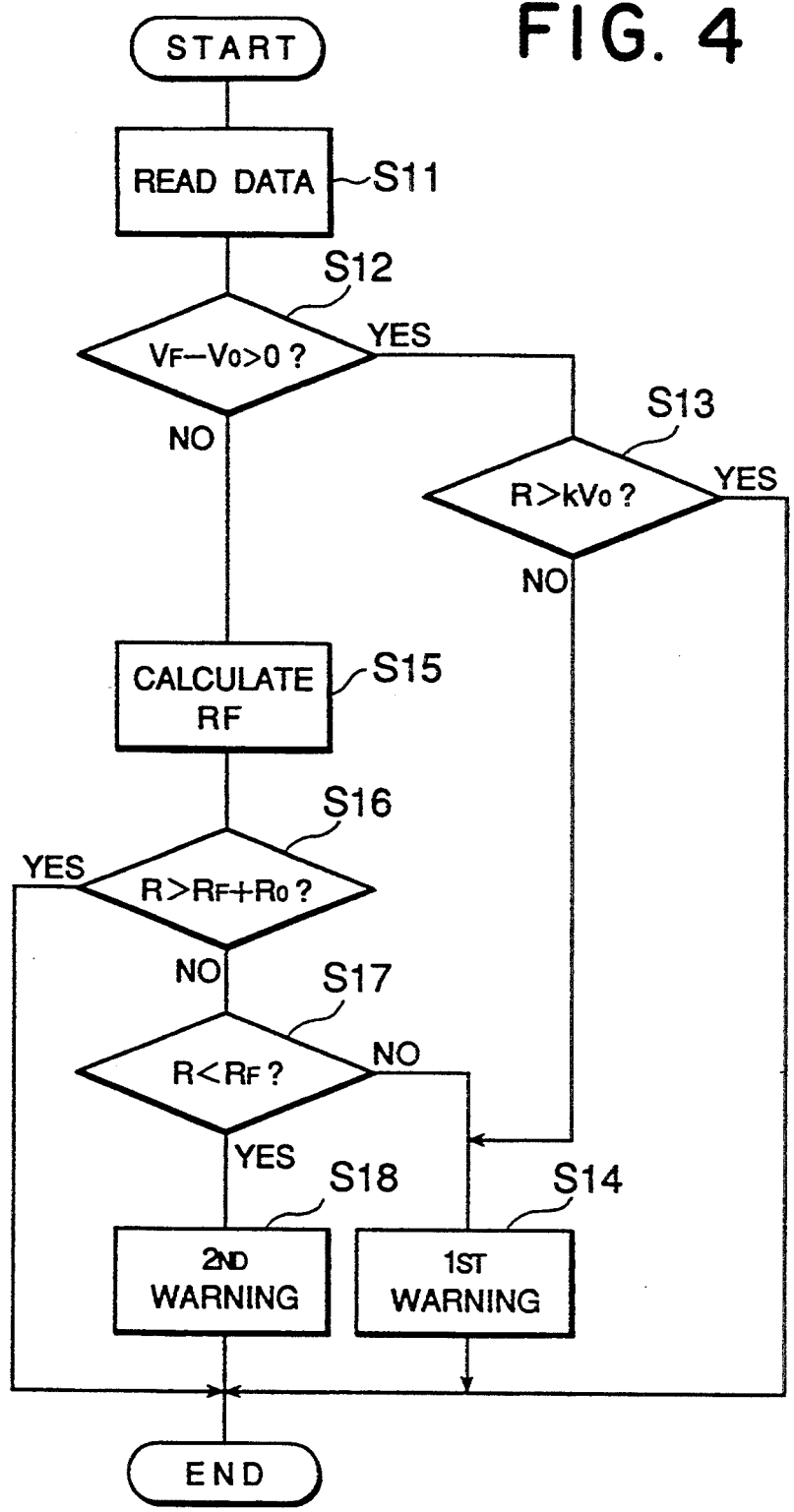
FIG. 4 is flow chart illustrating the operation of the embodiment of FIG. 3.

The operation of the embodiment of FIG. 3 will be described while referring to FIG. 4, which is a flow chart of a routine which can be performed by the computer 10 to control this embodiment. In Step S11, the computer 10 reads in data from each of sensors 2–4 and 6. In Step S12, the computer 10 determines whether the relative speed $V_F-V_0$ of the first and second vehicles is greater than 0. If the relative speed is greater than zero, then in Step S13, it is determined whether the vehicle separation R is greater than $kV_0$. If the separation R is less than or equal to $kV_0$, then in Step S14, the computer 10 drives the alarm 5 and a first warning is generated to caution the driver.

In Step S12, if the relative speed is negative, it means that the first vehicle 1 is growing closer to the second vehicle 20, so in Step S15, the computer 10 calculates by means of Equation (1) the minimum required vehicle separation $R_F$ for the driver to decelerate from the current speed $V_0$ to the speed $V_F$ of the second vehicle 20 without colliding with the second vehicle 20 assuming a rate of deceleration $\alpha$ produced by braking.

In Step S16, the computer 10 determines whether the actual separation R between the first and second vehicles is greater than $R_F+R_0$. If the vehicle separation R is less than or equal to this sum, then in Step S17 it is determined whether the vehicle separation R is less than $R_F$. If R is greater than or equal to $R_F$, then the driver can safely slow down the first vehicle 1 with a normal deceleration $\alpha$, so in Step S14, the alarm 5 is driven to generate the first warning. However, if the driver did not respond to the first warning and in Step S17 the vehicle separation R is smaller than $R_F$, then a dangerous situation exists, so in Step S18, the alarm 5 is driven to generate a second warning which alerts the driver to take immediate evasive action, such as stepping more firmly on the brakes or turning the steering wheel to avoid the second vehicle 20.

In Step S13, if the vehicle separation R is larger than $kV_0$, or in Step S16, if the vehicle separation is larger than $R_F+R_0$, there is no immediate danger of a collision, so a warning is not generated and the routine is ended.

As in the preceding embodiment, the value of one or more of $R_0$, k, and $t_0$ can be varied in accordance with the physical or mental state of the driver as sensed by the driver condition sensor 4 so that the first and second warnings are generated earlier, i.e., at a large vehicle separation R when the driver is fatigued or looking away from the road.

Furthermore, the first and second warnings are generated earlier when the environmental conditions are such as to increase the stopping distance of the first vehicle 1 or decrease the reaction time of the driver. For example, when the road on which the first vehicle 1 is travelling is wet, the rate of deceleration of the first vehicle 1 upon the driver's activating the brakes will be lower than on a dry road surface. In order to compensate for this, the computer 10 can vary the value of $\alpha$ in Equation (1) so as to increase when the environment sensor 6 detects strong rain. By decreasing $\alpha$, the value of $R_F$ will be increased, so the warnings will be generated earlier. Alternatively, one or more of $R_0$, k, and $t_0$ can be adjusted in accordance with the environmental condition sensor by the environment sensor 6. For example, $R_0$, k, or $t_0$ can be increased when the environment sensor 6 detects rain.

Thus, in this embodiment, the conditions for generation of a warning by the alarm 6 are varied in accordance with both the physical or mental state of the driver and environmental conditions, so the safety of the first vehicle 1 can be greatly increased.

Although this embodiment employs both a driver condition sensor 4 and an environment sensor 6, it is possible for a warning apparatus according to the present invention to be equipped with only the environment sensor 6 without the driver condition sensor 4, and for the conditions for generating a warning to be varied in accordance with the environmental conditions.

Figure 5:
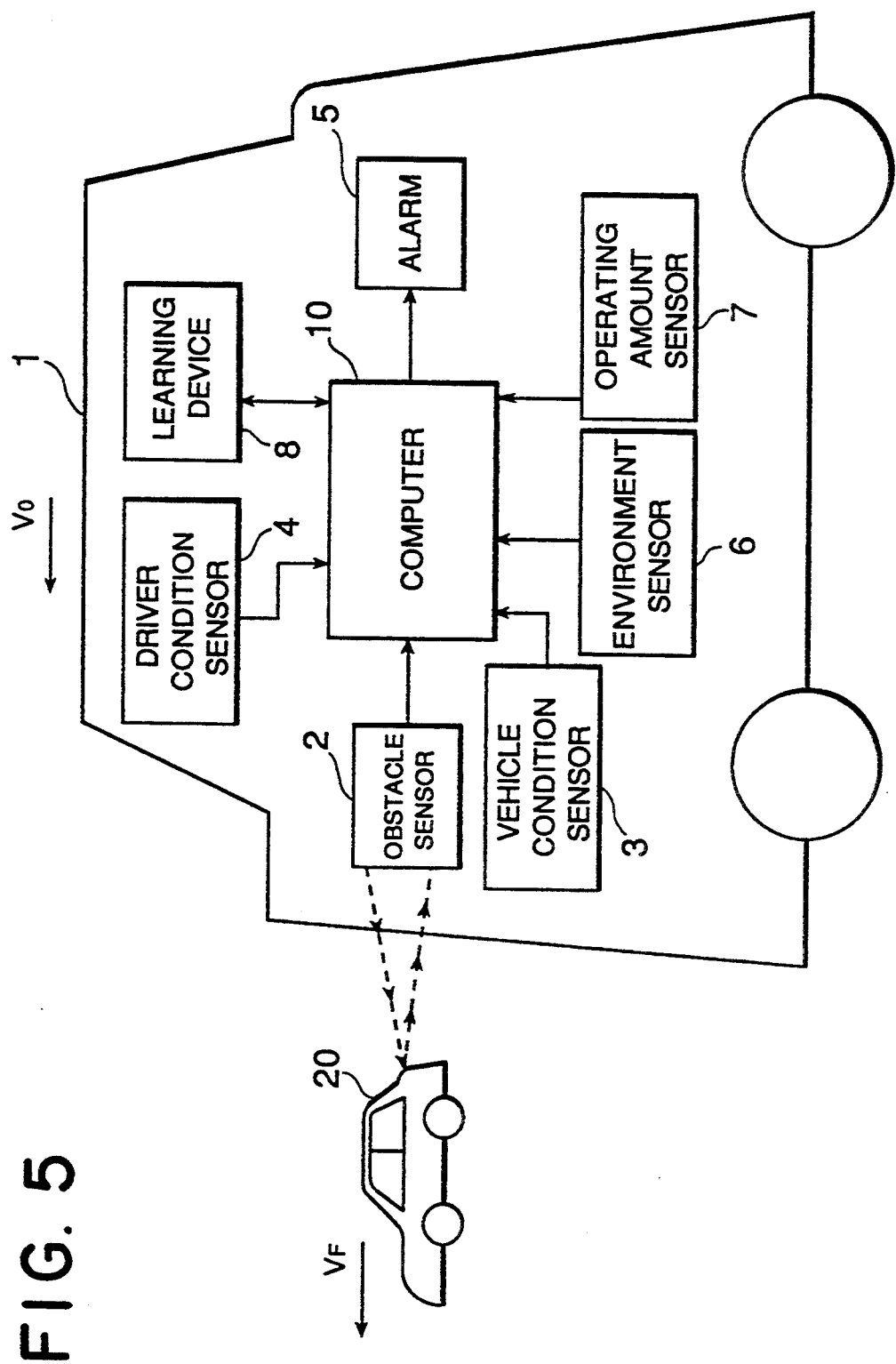
FIG. 5 is a block diagram of still another embodiment of a warning apparatus according to the present invention.

FIG. 5 illustrate yet another embodiment of the present invention installed on a first vehicle 1. The structure of this embodiment is similar to that of the embodiment of FIG. 3, but it further includes an operating amount sensor 7 and a learning device 8.

The operating amount sensor 7 senses one or more parameters related to the operation of equipment manipulated by the driver as he drives the first vehicle 1, and it generates a corresponding output signal which is provided to the computer 10. A few examples of the operating amount sensor 7 are a sensor for sensing the speed of depression of the accelerator pedal, a sensor for sensing the force applied by the driver to the brake pedal, or a sensor which senses the steering angle of the steering wheel of the first vehicle 1.

The learning device 8 receives the output signals from the vehicle condition sensor 3 and the operating amount sensor 7 and performs statistical processing to numerically evaluate the driving characteristics of the driver based on sensed operating characteristics such as the speed and force with which the driver operates the brakes, the accelerator pedal, or the steering wheel and the speed with which he accelerates and decelerates the vehicle.

In general, driving characteristics vary in accordance with the physical and mental state of the driver. When the driver is rested and alert, his reactions are fast, so the speed or depression of the acceleration pedal is fast, the depression of the brake pedal is strong, the rate of deceleration is fast, and as a whole the motions of the vehicle tend to be comparatively rough or violent. Conversely, when the driver is fatigued, the depression of the acceleration pedal is slow, the depression of the brake pedal is weak, and the rate of deceleration is slower, so the motions of the vehicle tend to be smoother than when the driver is rested. Therefore, the learning device 8 determines from the manner of operation of the first vehicle 1 when the driver is alert and when the driver is tired. When the learning device 8 determines that the driver is alert, the computer 10 delays the generation of the warnings by the alarm 5, i.e., decreases the vehicle separation R at which a warning is generated towards some predetermined limit so as to reflect the fast reaction time of the driver in his current condition. When the learning device 8 determines that the driver is fatigued, the computer 10 causes the warnings to be generated earlier by the alarm 5, i.e., at a larger value of R to compensate for the delayed reaction time of the driver caused by his fatigue.

Figure 6:
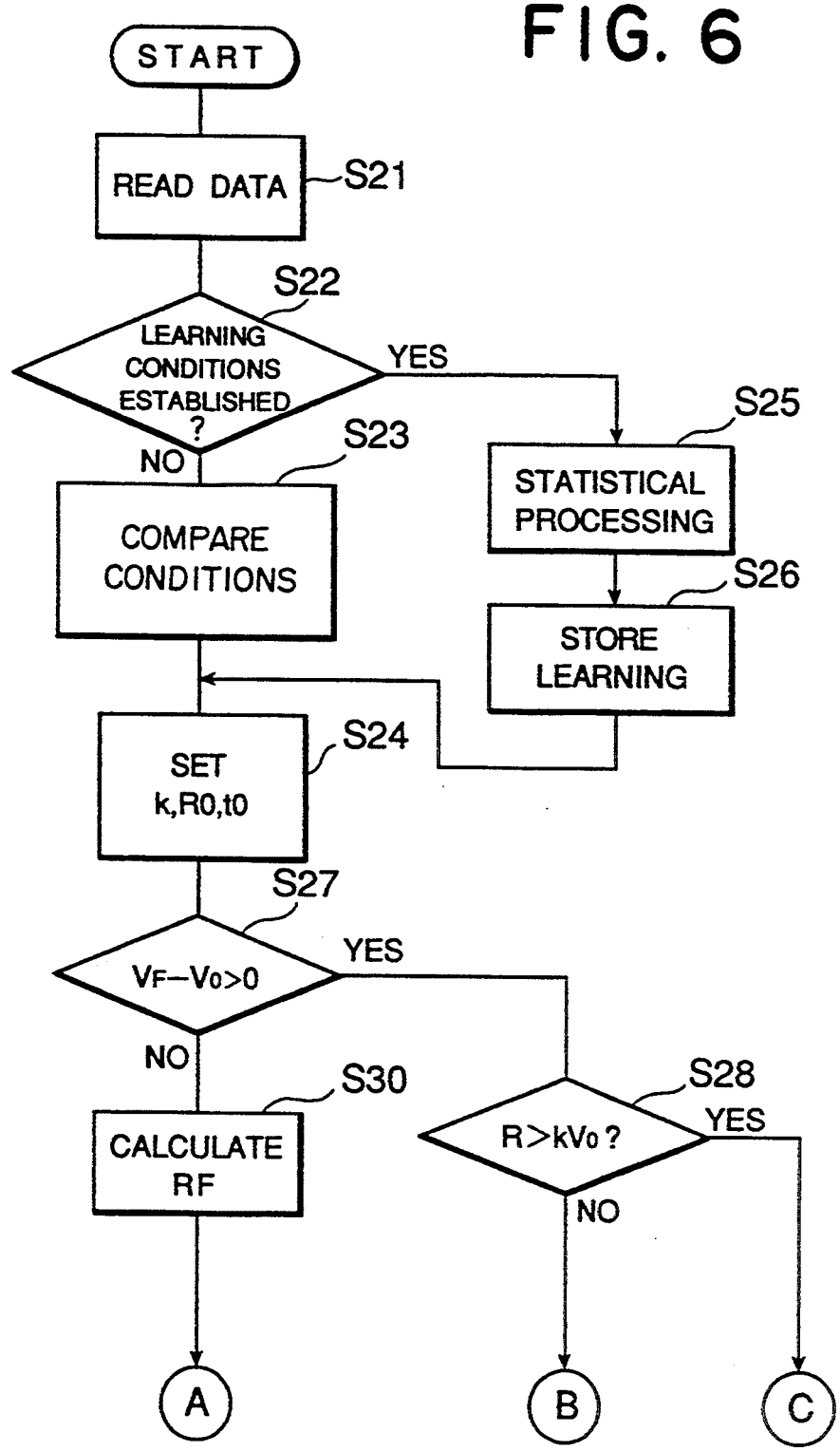
FIGS. 6 and 7 are flow charts illustrating the operation of the embodiment of FIG. 5.
Figure 7:
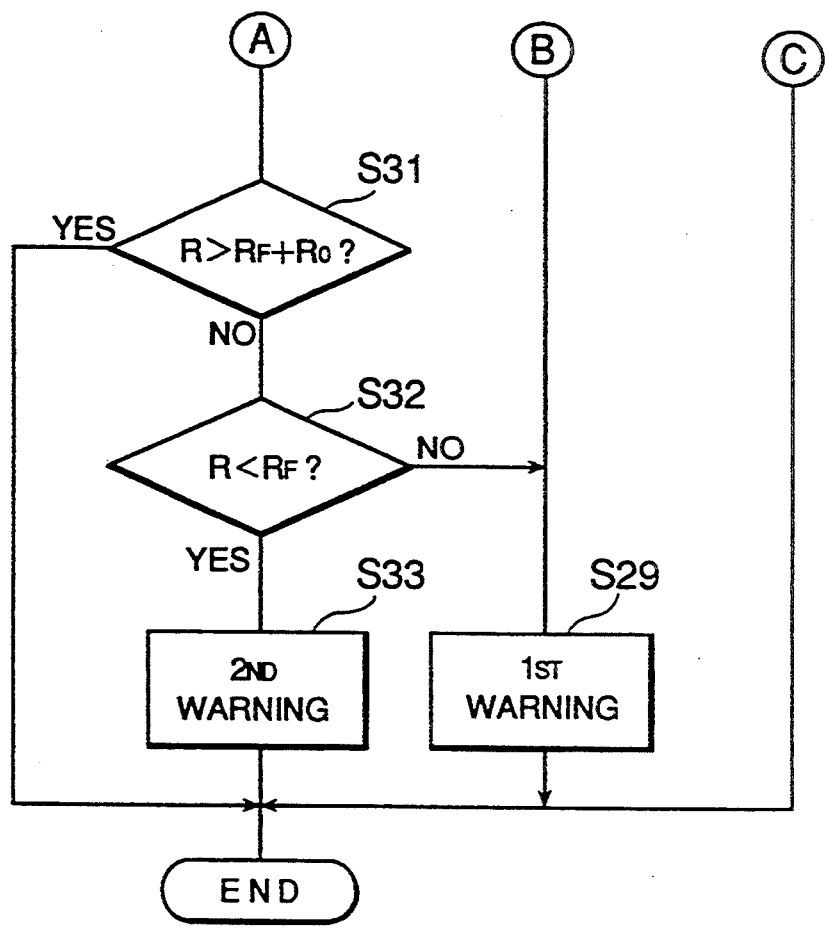

The operation of the embodiment of FIG. 5 will be described while referring to FIGS. 6 and 7, which are flow charts of a routine which can be performed by the computer 10 to control this embodiment. In Step S21, the computer 10 reads in data from each of sensors 2–4 and 6–8. In Step S22, the computer 10 determines whether the current operating conditions of the first vehicle 1 are suitable for performing learning. For example, suitable conditions can be when a predetermined length of time has passed since the first vehicle 1 has started or when a predetermined vehicle speed has been reached. If suitable conditions for learning have not been established, then in Step S23, the present operating conditions are compared with either conditions which were set at an initial stage (if this is the first pass through the routine) or with operating conditions learned by the learning device 8 (if this is the second or higher pass through the routine). Based on this comparison, the values of $k$, $R_0$, and $t_0$ are set in Step S24.

In Step 22, if it is determined that conditions for performing learning have been established, then in Step S25, the learning device 8 performs statistical evaluation of the data from the vehicle condition sensor 3 and the operating amount sensor 7 and determines the driving characteristics of the driver of the first vehicle 1. In Step S26, the characteristics determined in Step S25 are stored in an unillustrated memory. In Step S24, based on the driving characteristics determined by the learning device 8, the values of $k$, $R_0$, and $t_0$ are adjusted.

In Step S27, the computer 10 determines whether the relative speed $V_F-V_0$ of the first and second vehicles is greater than 0. If the relative speed is greater than zero, then in Step S28, it is determined whether the vehicle separation R is greater than $kV_0$. If the separation R is less than or equal to $kV_0$, then in Step S29, the computer 10 drives the alarm 5 and a first warning is generated to caution the driver.

In Step S27, if the relative speed is less than or equal to zero, in Step S30, the computer 10 calculates by means of Equation (1) the minimum required separation $R_F$ for the driver to decelerate from the current speed $V_0$ to the speed $V_F$ of the second vehicle 20 without colliding with the second vehicle 20 assuming a rate of deceleration $\alpha$.

In Step S31, the computer 10 determines whether the actual separation R between the first and second vehicles is greater than $R_F+R_0$. If the vehicle separation R is less than or equal to this sum, then in Step S32 it is determined whether the vehicle separation R is less than $R_F$. If R is greater than or equal to $R_F$, then the driver can safely slow down the first vehicle 1 with a normal deceleration $\alpha$, so in Step S29, the alarm 5 is driven to generate the first warning. However, if the driver of the first vehicle 1 did not react to the first warning and the vehicle separation R is found to be smaller than $R_F$ in Step S32, then a dangerous situation exists, so in Step S33, the alarm 5 is driven to generate a second warning which alerts the driver to take immediate evasive action, such as stepping more firmly on the brakes or turning the steering wheel to avoid the second vehicle 20.

In Step S28, if the vehicle separation R is larger than $kV_0$, or in Step S31, if the vehicle separation is larger than $R_F+R_0$, there is no immediate danger of a collision, so a warning is not generated and the routine is ended.

As in the previous embodiment, the values of one or more of $R_0$, $k$, and $t_0$ are varied in accordance with the physical or mental state of the driver as sensed by the driver condition sensor 4 and the environmental condition sensed by the environment sensor 6 so that the conditions which must be met for a warning to be generated, i.e., the vehicle separation R at which a warning is generated are set so that the driver will always have enough time to react to a warning generated by the alarm 5 to prevent a collision.

In the embodiment of FIG. 5, the computer 10 adjusts the conditions for generating a warning based on input signals from the driver condition sensor 4, the environment sensor 6, and the learning device 8. However, it is also possible for the computer 10 to adjust the conditions for generating a warning based only on input signals from the learning device 8, or based on input signals from the learning device 8 and only one of the driver condition sensor 4 and the environment sensor 6. Therefore, it is possible to omit one or both of sensors 4 and 6.

In the present invention, because the conditions for generating a warning are varied in accordance with changes in sensed conditions of the driver or the environment, the timing of the warnings will be suitable for the existing circumstances at any given time. Therefore, the driver of a vehicle equipped with the present invention will not be annoyed by unnecessary generation of warnings, and the vehicle can be made both safe and pleasant to drive.

What is claimed is:

1. A warning apparatus for a vehicle, comprising:
    obstacle sensing means for measuring a separation distance between a vehicle and an obstacle located in front of the vehicle;
    driver condition sensing means for sensing whether the driver is manipulating an accessory of the vehicle;
    an alarm; and
    a controller connected to said obstacle sensing means, said driver condition sensing means, and said alarm, comprising setting means for setting a distance value for safe vehicle separation, said setting means responsive to the driver condition sensing means to reduce said threshold distance value whenever an accessory is being manipulated, and warning generating means for controlling the alarm to generate a warning for the driver when the separation distance sensed by the obstacle sensing means is below said threshold distance value.

2. A warning apparatus as claimed in claim 1, wherein the driver condition sensing means comprises means for sensing when the driver is manipulating an accessory of the vehicle, and the setting means increases said distance value for safe vehicle separation when the driver condition sensing means senses that the driver is manipulating said accessory.

3. A warning apparatus as claimed in claim 1, further comprising weather condition sensing means connected to said controller for sensing a weather condition of a vehicle environment, wherein the setting means comprises means for varying said distance value for safe vehicle separation in accordance with changes in the sensed weather condition.

4. A warning apparatus as claimed in claim 3, wherein the weather condition sensing means comprises means for sensing rain.

5. A warning apparatus as claimed in claim 1, further comprising means for determining a driving performance characteristic of the driver connected to said controller, wherein the setting means varies said distance value for safe vehicle separation in accordance with the determined driving performance characteristic.

6. A warning apparatus as claimed in claim 1, including speed sensing means connected to said controller for sensing the speed of the vehicle $V_o$, wherein:
the controller includes means for sensing a relative speed ($V_o$-$V_F$) of the vehicle and the obstacle based on a separation distance sensed by said obstacle sensing means, wherein $V_F$ is the speed of the obstacle;
the setting means sets the distance value for safe vehicle separation to $kV_o$, wherein k is a value which is varied by the setting means in accordance with changes in the sensed physical or mental state of the driver; and
the warning generating means controls the alarm to generate a warning when the relative speed is decreasing and the vehicle separation distance is less than $kV_o$.

7. A warning apparatus as claimed in claim 1, wherein:
the controller includes means for sensing the relative speed ($V_o$-$V_F$) of the vehicle and the obstacle based on the separation distance sensed by said obstacle sensing means, wherein $V_o$ is the speed of the vehicle and $V_F$ is the speed of the obstacle; and
the setting means sets the distance value for safe vehicle separation to $$\frac{(V_o - V_F)^2}{2|\alpha|} + (V_o - V_F) t_o + R_o$$

and varies the value of at least one of $t_o$ and $R_o$ in accordance with changes in the sensed physical or mental state of the driver, wherein $t_o$ is an assumed reaction time of the driver, $R_o$ is a safety factor, and $\alpha$ is an assumed deceleration of the vehicle produced by braking.

8. A warning apparatus for a vehicle, comprising:
obstacle sensing means for measuring a separation distance between a vehicle and an obstacle;
driving performance determining means for determining when the driver is manipulating an accessory of the vehicle;
weather condition sensing means for sensing a weather condition of a vehicle environment;
an alarm; and
a controller connected to said obstacle sensing means, said driving performance determining means, said weather condition sensing means, and said alarm, comprising setting means for setting a distance value for safe vehicle separation and varying said distance value in response to said driving performance determining means and said weather condition sensing means, and warning generating means for controlling the alarm to generate a warning for the driver when a separation distance sensed by the obstacle sensing means is below said distance value for safe vehicle separation.

* * * * *